United States Patent
Tiryaki et al.

(10) Patent No.: US 9,988,136 B2
(45) Date of Patent: Jun. 5, 2018

(54) STRUCTURAL COMPONENT AND METHOD FOR PRODUCING A STRUCTURAL COMPONENT

(71) Applicant: Airbus Operations GmbH, Hamburg (DE)

(72) Inventors: Memis Tiryaki, Hamburg (DE); Michael Sauer, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 85 days.

(21) Appl. No.: 14/926,786

(22) Filed: Oct. 29, 2015

(65) Prior Publication Data

US 2016/0129984 A1    May 12, 2016

(30) Foreign Application Priority Data

Nov. 6, 2014    (EP) .................................... 14192008

(51) Int. Cl.
*B64G 1/00*        (2006.01)
*B64C 1/06*        (2006.01)
(Continued)

(52) U.S. Cl.
CPC .............. *B64C 1/061* (2013.01); *B22F 3/008* (2013.01); *B22F 7/004* (2013.01); *B32B 38/00* (2013.01); *B32B 41/00* (2013.01); *B33Y 80/00* (2014.12); *B64C 1/064* (2013.01); *B64C 3/182* (2013.01); *B64C 3/187* (2013.01); *B64G 1/22* (2013.01); *G05B 19/4097* (2013.01); *B22F 3/1055* (2013.01); *B22F 3/1115* (2013.01); *B32B 2038/0076* (2013.01); *B32B 2305/08* (2013.01); *B32B 2313/04* (2013.01); *B32B 2605/18* (2013.01); *B33Y 10/00* (2014.12); (Continued)

(58) Field of Classification Search
CPC ......... B64C 1/061; B64C 1/064; B64C 3/187; B64C 3/182; B33Y 80/00; B22F 3/008; B22F 7/004; B32B 38/00; B32B 41/00; B64G 1/22; G05B 19/4097
See application file for complete search history.

(56) References Cited

U.S. PATENT DOCUMENTS 2,389,767 A  *  11/1945  Dalton ..................... B64C 1/06
                                                          114/79 R
4,379,798 A       4/1983  Palmer et al.
(Continued)

FOREIGN PATENT DOCUMENTS

DE      101 63 848 A1    7/2003
DE    10 2006 040298 A1  3/2008
(Continued)

OTHER PUBLICATIONS

DE102006040298EnglishTranslation.*
(Continued)

*Primary Examiner* — Assres H Woldemaryam
(74) *Attorney, Agent, or Firm* — Jenkins, Wilson, Taylor & Hunt, P.A.

(57) ABSTRACT

A structural component for reinforcing the fuselage of an aircraft or spacecraft is integrally formed and segmented into surface-like stiffening sections, whereby at least one stiffening section is formed as a rigid mesh section, and at least one stiffening section is formed as a solid section.

16 Claims, 4 Drawing Sheets

(51) Int. Cl.
*B64C 3/18* (2006.01)
*B33Y 80/00* (2015.01)
*B22F 3/00* (2006.01)
*B32B 38/00* (2006.01)
*B32B 41/00* (2006.01)
*B64G 1/22* (2006.01)
*G05B 19/4097* (2006.01)
*B22F 7/00* (2006.01)
*B33Y 10/00* (2015.01)
*B33Y 50/02* (2015.01)
*B64C 1/00* (2006.01)
*B22F 3/105* (2006.01)
*B22F 3/11* (2006.01)

(52) U.S. Cl.
CPC ....... *B33Y 50/02* (2014.12); *B64C 2001/0072* (2013.01); *B64C 2001/0081* (2013.01); *G05B 2219/35134* (2013.01); *Y02P 10/295* (2015.11)

(56) References Cited

U.S. PATENT DOCUMENTS

| | | | |
|---|---|---|---|
| 5,431,870 A | 7/1995 | Andre | |
| 6,391,251 B1 * | 5/2002 | Keicher | B05B 7/14 419/7 |
| 6,945,727 B2 | 9/2005 | Christman et al. | |
| 7,867,621 B2 | 1/2011 | Rawlings et al. | |
| 8,356,771 B2 | 1/2013 | Kern et al. | |
| 8,479,880 B2 | 7/2013 | Mathur | |
| 8,540,921 B2 | 9/2013 | Senibi et al. | |
| 2004/0011927 A1 * | 1/2004 | Christman | B29C 65/00 244/131 |
| 2007/0039284 A1 | 2/2007 | Munoz et al. | |
| 2010/0012783 A1 * | 1/2010 | Kern | B64C 1/12 244/131 |
| 2010/0129589 A1 * | 5/2010 | Senibi | B32B 5/18 428/71 |
| 2013/0344291 A1 * | 12/2013 | Pearson | B29C 70/865 428/157 |
| 2014/0286700 A1 * | 9/2014 | Tiryaki | B64C 1/00 403/282 |
| 2015/0367619 A1 * | 12/2015 | Butler | B29C 70/545 428/57 |

FOREIGN PATENT DOCUMENTS

| | | | | |
|---|---|---|---|---|
| DE | 102006040298 | * | 3/2008 | ........ F16S 5/00 |
| DE | 10 2006 040298 B4 | | 6/2008 | |
| EP | 0 603 066 A1 | | 6/1994 | |
| EP | 2 431 175 A1 | | 3/2012 | |
| EP | 2 674 290 A1 | | 12/2013 | |
| EP | 2746038 A1 | | 6/2014 | |
| GB | 392 905 A | | 5/1933 | |
| GB | 555 496 A | | 8/1943 | |
| GB | 946 762 A | | 1/1964 | |
| IE | 59 224 B1 | | 1/1994 | |
| WO | WO 01/85386 A2 | | 11/2001 | |
| WO | WO 2006/119732 A1 | | 11/2001 | |

OTHER PUBLICATIONS

Extended European Search Report for Application No. EP 14 19 2008 dated Apr. 24, 2015.
Chinese Office Action for Application No. 201510843205 dated Apr. 1, 2017.

* cited by examiner

STRUCTURAL COMPONENT AND METHOD FOR PRODUCING A STRUCTURAL COMPONENT

CROSS-REFERENCE TO RELATED APPLICATION

This application claims priority to EP 14 192008.2 filed Nov. 6, 2014, the entire disclosure of which is incorporated by reference herein.

TECHNICAL FIELD

The present disclosure pertains to a structural component for an aircraft or spacecraft and a method for producing a structural component of this type.

BACKGROUND

Although applicable to any kind of aircraft or spacecraft or the like, the present disclosure and the problem on which it is based will be explained in greater detail with reference to fuselage shells of commercial aircraft.

A fuselage shell of a modern airplane consists of a rigid framework of stiffening elements that is covered by a metal or composite skin. The framework normally comprises a series of frames bent into a circumferential direction according to the shape of the fuselage cross section and a plurality of longitudinal stringers that are joined to the frames. A typical fuselage is divided in the longitudinal direction into so-called frame stations, each of which contains one frame that is built up of several frame segments. Typically 4 to 8 of such frame segments are coupled together in the circumferential direction to form one frame. Even though there are various types of frames with different cross sectional shapes, often these are formed from sheet metal in a roll forming process.

The document DE 10 2006 040 298 B4 discloses a lightweight structural component, in particular for an aircraft, having a skin panel and stiffening elements arranged on it. The stiffening elements comprise two substantially parallel solid web elements, which are each attached to the skin panel at a respective foot portion and are connected with each other at a respective head portion by a number of connection elements that extend from one web element to the other web element such that openings are left in between the connection elements. This specific configuration of a stiffening element with two solid web elements and a roof-like framing saves weight in case it is used as a stringer or frame compared to a closed stiffening element of the same cross section. In addition, the space between the two web elements can be utilized for various purposes, e.g. for cable routing.

SUMMARY

It is one idea of the present disclosure to reduce the weight of generic structural components in a cost-efficient way while maintaining sufficient rigidity of the components. A structural component for reinforcing the fuselage of an aircraft or spacecraft is integrally formed and segmented into surface-like stiffening sections. Hereby, at least one stiffening section is formed as a rigid mesh section and at least one stiffening section is formed as a solid section.

Furthermore, a method for forming a structural component for reinforcing the fuselage of an aircraft or spacecraft comprises using a computer-based system to operate upon data that corresponds to a geometric configuration of the structural component. The method further comprises predetermining an expected stress load of the structural component with the computer-based system. The method further comprises integrally forming the structural component and thereby segmenting the structural component into surface-like stiffening sections. Hereby, at least one stiffening section is formed as a rigid mesh section, at least one stiffening section is formed as a solid section, and the at least one mesh section and the at least one solid section are arranged and formed to optimize the stiffness of the structural component for the predetermined stress load of the structural component.

One idea of the present disclosure is to form a structural component that to some extent features an open, mesh-like structure. The structural component can contain one or several solid sections as well as one or several lightweight mesh-like sections. Hereby, in accordance with the disclosure herein, the term mesh refers to a surface-like structure with a plurality of openings that cover a significant part of the surface-like structure in such a way that the surface-like structure retains a certain rigidity. The term mesh, as taken in the sense of the disclosure herein, also includes grids, gratings, surface-like lattice structures or the like.

The configuration and formation of the mesh sections can be optimized according to the expected load situation in specific areas of the structural component. Hence, the present disclosure has the advantage that only load affected areas or high stress parts of the structural component have to be formed in a solid way. In less load affected areas on the other hand, the structural component can be provided with lightweight mesh. For example, a metal mesh is much lighter than, for example, sheet metal and nonetheless features a certain stiffness. In principle, depending on the application, structural components can be made almost entirely from a mesh-like structure. Used in aircraft, such structural components can save weight and fuel and thus can help to reduce costs.

With modern computing methods, like for example topology optimization, the expected stress load of the structural component can be predetermined and the results can be used to optimize the configuration of the solid sections and the mesh sections in order to achieve an optimal balance of stiffness and weight.

Advantageous embodiments and improvements of the present disclosure are found in the subordinate claims.

According to an embodiment of the structural component, a plurality of solid sections are connected with each other to form a stiffening framework. By joining several solid sections, the stiffness of the structural component can be improved. For example, the structural component can be formed from a mesh-like structure that is traversed and/or surrounded by a solid framework or framing structure. The stiffening framework can be formed as a support of the structural component such that the structural component is mainly stabilized by the underlying framework of solid sections. Hence, the mesh section(s) can be formed in an extremely lightweight configuration.

According to yet another embodiment of the structural component, the plurality of solid sections of the stiffening framework surround a plurality of mesh sections. The structural component is thus built up of a "coarsely-meshed" framework of solid sections that encloses "tightly-knit" mesh sections. Here, the mesh supports the stiffness of the framework.

The at least one mesh section and the at least one solid section may be arranged and formed to optimize the stiffness of the structural component for a predetermined stress load of the structural component. Topology optimization or similar methods can be used to optimize the structural component following a stress calculation according to a predetermined stress load of the structural component. For example, the mesh structure may only be reinforced in load carrying areas by switching to solid sections in these cases. Further, also the directionality of the mesh or grid could be chosen with respect to the load direction. Depending on the application, different tradeoffs between stiffness and weight would be preferred. Even the material thickness could be increased or decreased depending on the load situation, in the solid sections as well as in the mesh sections.

Free form fabrication (FFF), direct manufacturing (DM), fused deposition modelling (FDM), powder bed printing (PBP), laminated object manufacturing (LOM), stereolithography (SL), selective laser sintering (SLS), selective laser melting (SLM), selective heat sintering (SHS), electron beam melting (EBM), direct ink writing (DIW), digital light processing (DLP) and additive layer manufacturing (AM) belong to a general hierarchy of additive manufacturing (AM) methods. Often termed as 3D printing, those systems are used for generating three-dimensional objects by creating a cross-sectional pattern of the object to be formed and forming the three-dimensional solid object by sequentially building up layers of material. Any of such procedures will be referred to in the following description as AM or 3D printing without loss of generality. AM or 3D printing techniques usually include selectively depositing material layer by layer, selectively fusing or solidifying the material and removing excess material, if needed.

The structural component may be integrally formed from metal. This can be accomplished, for example, by utilizing an AM or 3D printing technology. By using AM processes, even highly complex two- or three-dimensional metal components can be produced in a relatively straightforward manner. This is one possible way to integrally form structural components consisting of solid and mesh sections. In principle, AM processes can also be used to integrally form structural components from a composite material, for example a carbon-fiber-reinforced composite material.

The structural component may be substantially formed from aluminum or titanium. Aluminum alloys are widely used in aircraft manufacturing due to their durability and reliability. Titanium or titanium alloys are highly resistant to temperature and corrosion, and feature high strength despite relatively low density compared to other metals. Hence, titanium is particularly utilized in case of highly stressed components of aircraft or spacecraft.

According to an embodiment of the structural component, the structural component is formed in an additive manufacturing process and the structural component is substantially formed from aluminum and/or titanium. The AM process even allows to combine several metals and integrally form components of a mixture of different materials. Like this, for example, the solid sections could be formed from titanium while the mesh sections could be made from much less expensive aluminum.

The structural component may be formed as a frame element or a stringer element of an aircraft or spacecraft. At least one of the solid sections may be formed as a frame coupling element and/or a stringer coupling element. Solid sections cannot only be used to increase the stiffness of the structural component, but can also be utilized to create coupling sections, for example for coupling together several frame sections or for attaching a stringer to a frame. Applications are conceivable where structural components are made entirely from a mesh-like structure with the exception of one or several solid coupling sections.

According to an embodiment of the structural component, at least one of the solid sections is formed as an assembly area for assembling clips, support angles and/or brackets to the structural component. Thus, in case that the structural component is formed as a frame or stringer, these assembly areas can be used to couple the component with other aircraft components, like for example the fuselage skin.

According to an embodiment of the method, integrally forming the structural component comprises an additive layer manufacturing process. According to an alternative embodiment of the method, integrally forming the structural component comprises punching and/or milling holes into a sheet metal. Thus, the structural component can either be formed directly in one step in a 3D-printing process or, alternatively, in several steps by first forming a basic metal component (e.g. from sheet metal in a roll forming process) and then punching or milling openings into the metal component.

According to yet another embodiment of the method, the method further comprises covering the structural component with a layer of fiber-reinforced composite material. The fiber-reinforced composite material may contain a polymer matrix reinforced with carbon fibers. The method may further comprise curing the polymer matrix in an autoclave process. Thus, in these embodiments of the method, the mesh design can be used as a "flying tool". For example, it is a widely known method for the production of profiled components made from carbon fiber-reinforced plastic (CFRP) to form a so-called preform by braiding fibers around a core. The preform is subsequently impregnated with a resin matrix and is then hardened, e.g. in an autoclave process. After that, the core is usually removed. Employing such methods, various profile types can be produced, e.g. C-, Ω-, and Z-shaped profiles and the like. By using a method according to the current disclosure herein, it is possible to utilize the structural component as a core for the preform. However, due to the low weight of the structural component there is no need to remove the core afterwards as in case of the known methods. The remaining core would even further increase the stiffness of the CFRP-component without increasing its weight significantly.

BRIEF DESCRIPTION OF THE DRAWINGS

The disclosure herein will be explained in greater detail with reference to exemplary embodiments depicted in the drawings as appended.

The accompanying drawings are included to provide a further understanding of the present disclosure and are incorporated in and constitute a part of this specification. The drawings illustrate the embodiments of the present disclosure and together with the description serve to explain the principles of the disclosure herein. Other embodiments of the present disclosure and many of the intended advantages of the present disclosure will be readily appreciated as they become better understood by reference to the following detailed description. The elements of the drawings are not necessarily to scale relative to each other. In the figures, like reference numerals denote like or functionally like components, unless indicated otherwise.

DETAILED DESCRIPTION

Although specific embodiments are illustrated and described herein, it will be appreciated by those of ordinary skill in the art that a variety of alternate and/or equivalent implementations may be substituted for the specific embodiments shown and described without departing from the scope of the present disclosure. Generally, this application is intended to cover any adaptations or variations of the specific embodiments discussed herein.

Figure 1:
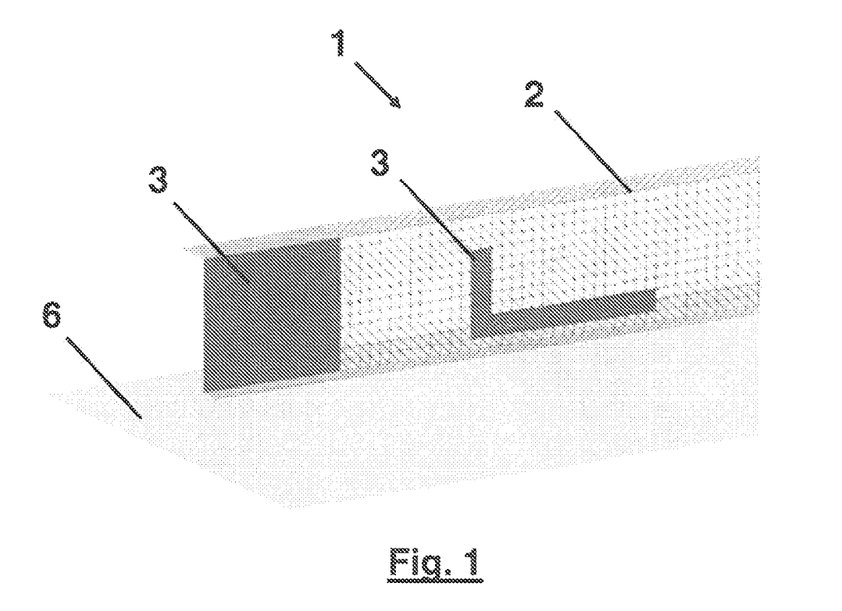
FIG. 1 schematically illustrates a structural component according to an embodiment of the disclosure herein.

FIG. 1 schematically illustrates a structural component according to an embodiment of the disclosure herein.

On FIG. 1 reference sign 1 denotes a structural component. The structural component 1 has a Z-like shape and consists of or comprises two horizontal surface-like "flange" elements which are connected with each other by a vertical surface-like "web" element. The structural component 1 shown may be a frame element or a stringer element of an aircraft or spacecraft. For example, the structural component 1 can be formed as one of several frame elements of a frame station of a commercial airplane. On FIG. 1, the fuselage skin 6 of an airplane is schematically indicated below the structural component 1. In this case, the structural component 1 is formed to reinforce the fuselage skin 6 of the airplane.

The depicted structural component consists primarily of or comprises several rigid lightweight mesh sections 2. The openings of the mesh sections 2 are spaced apart in regular intervals. The spacing of the openings can be chosen in a range between a few millimeters and several decimeters, e.g. about 1 cm.

Apart from the mesh sections 2, the structural component 1 is provided with two solid sections 3. One of these solid sections 3 is positioned at the end piece of the structural component 1 on the left of FIG. 1 and is formed as a frame coupling element and/or a stringer coupling element. This means in particular that the material thickness of this solid section 3 is chosen in such a way that riveting or similar fastening methods can be utilized to mount the structural component 1 to the fuselage skin 6 of an airplane. For example, the structural component 1 can be a frame element and the solid section 3 can be formed to couple the structural component 1 with another frame element to form a frame of a frame station of a commercial airplane. The thickness of the solid sections 3 may fall into the millimeter regime, e.g. the thickness can have a fixed value of 1.6 mm. In general, material thicknesses may be implemented between fractions of a millimeter and several centimeters.

The structural component 1 shown in FIG. 1 is further provided with a second solid section 3 that is formed as an assembly area for assembling clips 4, support angles and/or brackets or the like to the structural component 1. For example, the structural component 1 can be a frame element that is riveted to an assembly clip 4 (not shown in FIG. 1) in the usual way for fixing the frame element to the fuselage skin 6 of an airplane. Here, the assembly clip 4 may be a sheet metal component or the like.

The structural component 1 depicted in FIG. 1 is formed in an additive manufacturing (AM) process, sometimes also called 3D printing. Thus, this embodiment of the disclosure herein is integrally formed from metal in a process where successive layers of metal are laid down upon each other. The material can be aluminum, titanium, or an alloy of these metals or other metals. More generally, a structural component 1 according to the present disclosure can be made from any common material used in aircraft production. Additive manufacturing makes it even possible to integrally form structural components 1 from a combination of different materials. For example, the solid sections 3 could be formed from titanium while the mesh sections 2 could be made from much less expensive aluminum.

Additive manufacturing is a computer based process. With the help of a computer-based system and a digitalized geometric configuration of the structural component 1, it is possible to design and optimize even very complex structural components 1 in a straightforward manner. The expected load situation in a specific area of an airplane can be studied in detail on the computer-based system. Topology optimization or similar methods can be used to optimize the structural component 1 following a stress calculation according to a predetermined stress load of the structural component 1. Thus, for a given set of design requirements, an optimal component layout can be found. Next, the structural component 1 is integrally formed in the AM process. In the course of this process, the structural component 1 is segmented into surface-like stiffening sections, i.e. rigid mesh sections 2 and solid sections 3. The mesh sections 2 and the solid sections 3 can thereby be arranged and formed to optimize the stiffness of the structural component 1 for the predetermined stress load of the structural component.

The depicted structural component 1 depicted on FIG. 1 is formed in an extremely lightweight configuration, as it primarily consists of mesh sections 2. In this sense, it is much lighter than a solid component of the same shape made from the same material. The mesh provides a certain rigidness and stiffness to the structural component 1, which can be additionally supported by the solid sections 3. Thus, this embodiment of the present disclosure can bring a significant weight benefit for certain aircraft or spacecraft.

Depending on the application, other production methods could be utilized. Instead, for example, a structural component of the depicted type could be produced in several steps. First, a basic metal component could be formed from sheet metal in a roll forming process. Next, openings could be formed into the basic metal component by punching or milling or similar processes.

The structural component 1 shown on FIG. 1 is only an example and can be adjusted to specific applications. According to the disclosure herein, geometric variations of the structural component 1 are provided that comprise amongst others L-, C-, Ω-, and Z-shaped profiles and the like. Further, the illustrated configuration of mesh sections 2 and solid sections 3 is chosen purely for illustration purposes. The present disclosure provides structural components 1 with very generic shapes and configurations. The spacing and directionality of the mesh sections 2 can be chosen and optimized according to the specific application. In particular, the mesh sections 2 do not necessarily need to be arranged in a regular way with equidistant openings. Further, the material thickness of the mesh sections 2 as well as of the solid sections 3 can be varied and optimized depending on the specific load or the stress situation of the structural component 1. In the embodiment shown in FIG. 1, the solid sections 3 are formed either as frame coupling sections or as assembly areas. However, the present disclosure also foresees solid sections 3 that are mainly formed to reinforce the structural component 1 and increase the stiffness of it. This will be explained in more detail below by the further exemplary embodiments.

Figure 2:
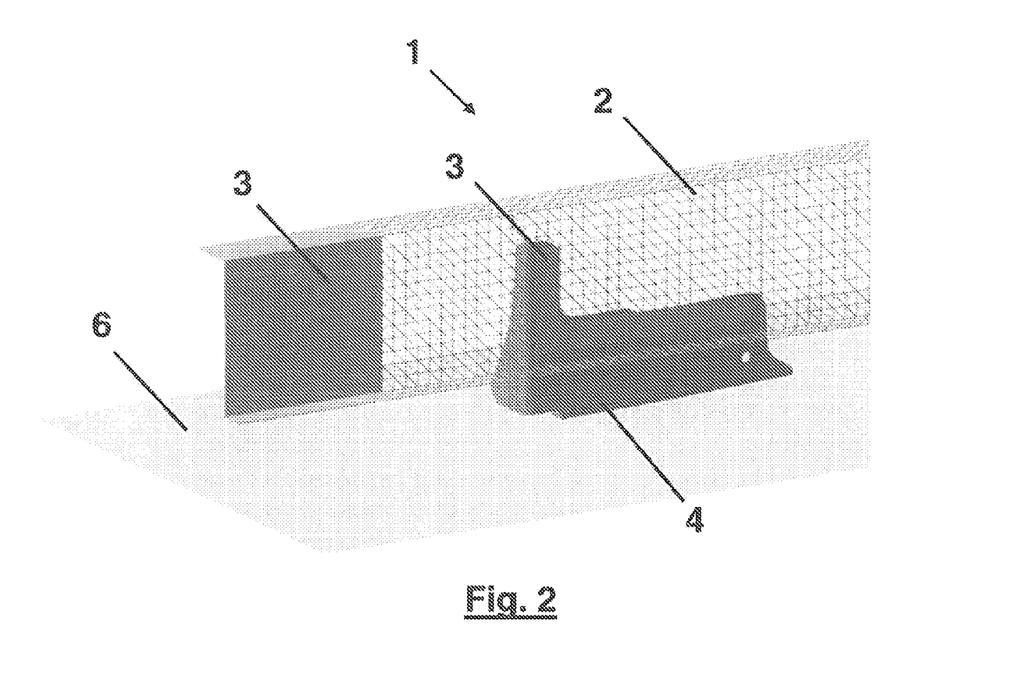
FIG. 2 shows an assembly clip mounted to the structural component depicted in FIG. 1.

FIG. 2 shows an assembly clip 4 mounted to the structural component 1 depicted on FIG. 1.

As explained above, the structural component 1 of this embodiment is provided with a solid section 3 that is formed as an assembly area for assembling clips 4, support angles and/or brackets or the like. In this exemplary embodiment, the structural component 1 is a frame element that is riveted to an assembly clip 4 made of sheet metal for fixing the frame element to the fuselage skin 6 of an airplane. The assembly clip 4 can be riveted to the fuselage skin of an aircraft as well as to an adjacent stringer element.

It should be noted that structural components 1 according to the present disclosure can be used to replace legacy components made from solid metal in airplanes that are already in operation. In line with the present disclosure, structural components 1 can be produced that match the basic shape of legacy components. In contrast to the legacy components, however, the structural components 1 according to the present disclosure can be built in a much lighter way due to the mesh-like structures. Solid coupling sections 3 can be provided in all areas where the structural component 1 needs to be attached to other aircraft components.

Figure 3:
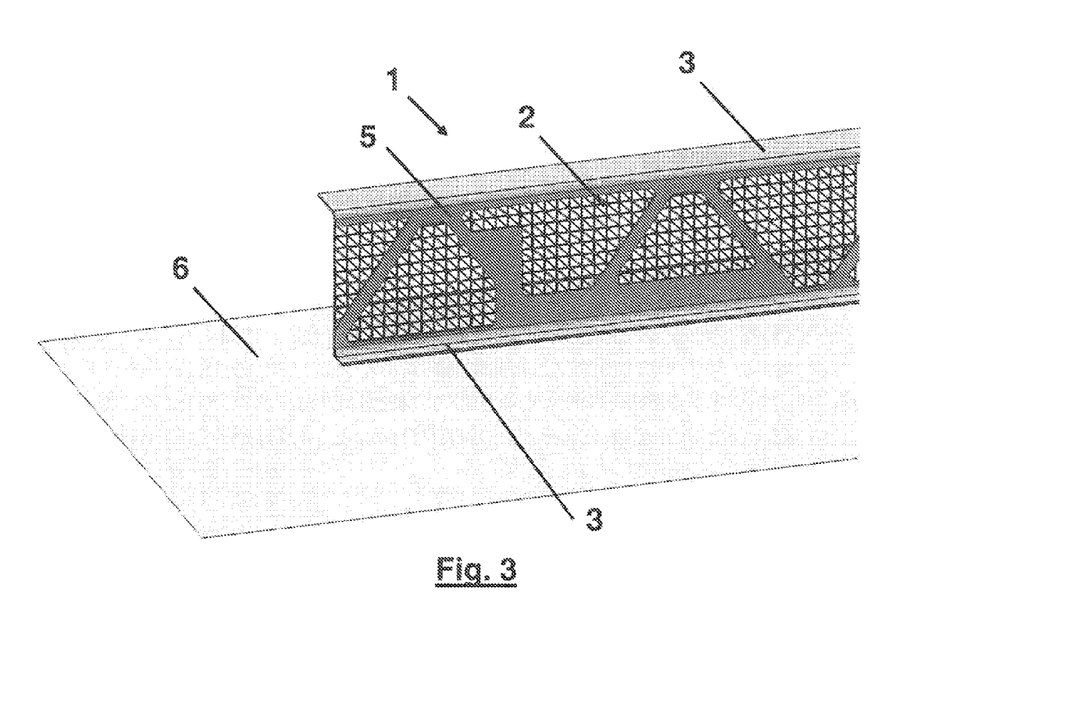
FIG. 3 schematically illustrates a structural component according to a further embodiment of the disclosure herein.

FIG. 3 schematically illustrates a structural component 1 according to a further embodiment of the disclosure herein.

The structural component 1 shown on FIG. 3 is basically similarly shaped as the structural component 1 depicted on FIG. 1. Hence, it features a Z-like cross section that consists of or comprises two horizontal surface-like "flange" elements which are connected with each other by a vertical surface-like "web" element. The fuselage skin 6 of an airplane is schematically indicated below the structural component 1. Also in this case, the structural component 1 is formed as a frame section to reinforce the fuselage skin 6 of the airplane.

Contrary to the structural component 1 from FIG. 1, this embodiment has a plurality of solid sections 3 which are connected with each other to form a stiffening framework 5. The stiffening framework 5 is hereby formed as a support of the structural component. Moreover, the plurality of solid sections 3 of the stiffening framework 5 surround a plurality of mesh sections 2.

Again, the structural component 1 is formed in an additive manufacturing process. In this case, the plurality of mesh sections 2 as well as the plurality of solid sections 3 are arranged and formed to optimize the stiffness of the structural component 1. This can include optimizing the configuration, the alignment and/or the orientation of the solid sections 3. Furthermore, also the material strength of the solid sections 3 can be varied. In a similar way, the specific structure of the mesh sections 2 can be optimized to meet certain desired design requirements. This may include the spacing of the mesh openings, the material strength, etc.

The AM process makes it possible to produce such complicated shapes with partly solid and partly open structure in one metal piece. The solid sections 3 can be additionally formed as coupling areas for coupling the structural component 1 to frames and/or stringers or to other components, like assembly clips, brackets etc.

For example, the mesh sections 2 can be predominantly placed in areas where the expected load is relatively low. The solid sections 3 on the other hand can reinforce the structural component 1 in high stress areas or areas necessary for assembly. As a result, a structural component according to this embodiment of the disclosure herein can be designed and produced in a weight saving manner while maintaining sufficient rigidity of the component.

Figure 4:
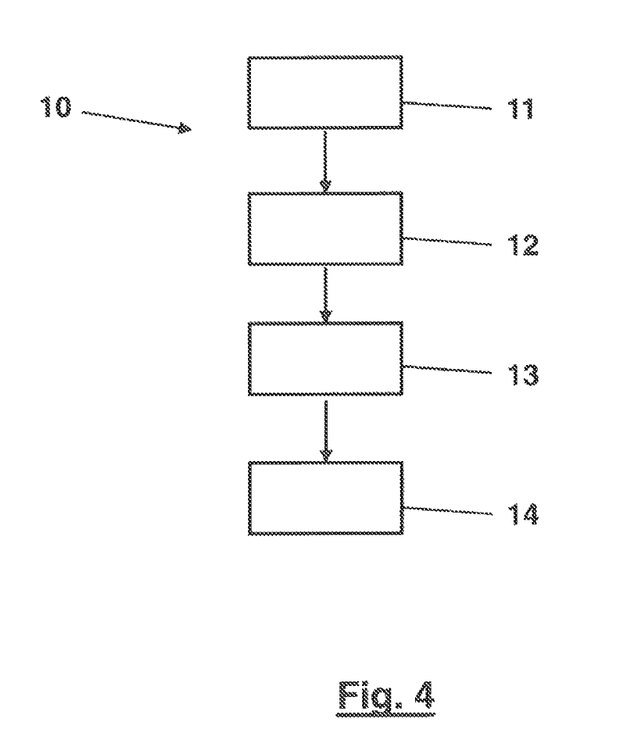
FIG. 4 schematically illustrates a method for forming a structural component according to a further embodiment of the disclosure herein.

FIG. 4 schematically illustrates a method 10 for forming a structural component 1 according to a further embodiment of the disclosure herein.

The method 10 comprises using a computer-based system to operate upon data that corresponds to a geometric configuration of the structural component 1. The method 10 further comprises predetermining 11 an expected stress load of the structural component 1 with the computer-based system. In addition, the method 10 comprises integrally forming 12 the structural component 1 from metal and thereby segmenting the structural component 1 into surface-like stiffening sections. Hereby, at least one stiffening section is formed as a rigid mesh section 2 and at least one stiffening section is formed as a solid section 3.

The at least one mesh section 2 and the at least one solid section 3 are arranged and formed to optimize the stiffness of the structural component 1 for the predetermined stress load of the structural component.

This embodiment of the method optionally further includes covering 13 the structural component 1 with a layer of fiber-reinforced composite material. The fiber-reinforced composite material hereby contains a polymer matrix reinforced with carbon fibers. In addition, the method optionally further comprises curing 14 the polymer matrix in an autoclave process.

Thus, in this particular embodiment of the method, a structural component 1 can be produced that has an outer layer of carbon fiber-reinforced plastic and a core of metal that is at least partially formed in a mesh-like structure. This can be used, to form and reinforce known structure components 1 of various shapes that are formed out of fiber-reinforced composite materials.

The method and other subject matter disclosed herein can be implemented in software in combination with hardware and/or firmware. For example, the subject matter described herein can be implemented in software executed by a processor or processing unit. In one exemplary implementation, the subject matter described herein can be implemented using a computer readable medium having stored thereon computer executable instructions that when executed by a processor of a computer control the computer to perform steps. Exemplary computer readable mediums suitable for implementing the subject matter described herein include non-transitory devices, such as disk memory devices, chip memory devices, programmable logic devices, and application specific integrated circuits. In addition, a computer readable medium that implements the subject matter described herein can be located on a single device or computing platform or can be distributed across multiple devices or computing platforms.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

What is claimed is:

1. An aircraft structural component for reinforcing a fuselage of an aircraft or spacecraft, the structural component comprising:
a planar web segmented into stiffening sections, wherein the stiffening sections are mutually co-planar,
wherein the structural component is an integrally formed frame element or stringer element,
wherein at least a first stiffening section of the stiffening sections is configured as a rigid mesh section,
wherein at least a second stiffening section of the stiffening sections is configured as a solid section,
wherein a plurality of solid sections are connected with each other to form a stiffening framework, and
wherein the plurality of solid sections of the stiffening framework surround a plurality of rigid mesh sections.

2. The structural component of claim 1, wherein the at least first stiffening section and the at least second stiffening section are arranged and formed to optimize a stiffness of the structural component for a predetermined stress load of the structural component.

3. The structural component of claim 1, wherein the structural component is integrally formed from metal.

4. The structural component of claim 1, wherein the structural component is substantially formed from aluminum or titanium.

5. The structural component of claim 1, wherein the structural component is formed in an additive manufacturing process and the structural component is substantially formed from aluminum and/or titanium.

6. The structural component of claim 1, wherein at least one of the plurality of solid sections is configured as a frame coupling element and/or a stringer coupling element.

7. The structural component of claim 1, wherein at least one of the plurality of solid sections is configured as an assembly area for assembling clips, support angles, and/or brackets to the structural component.

8. An aircraft or spacecraft comprising a structural component, the structural component comprising a planar web segmented into stiffening sections,
wherein the structural component is a frame element or a stringer element and is integrally formed therewith,
wherein the stiffening sections are mutually co-planar,
wherein at least a first stiffening section of the stiffening sections is configured as a rigid mesh section,
wherein at least a second stiffening section of the stiffening sections is configured as a solid section,
wherein a plurality of solid sections are connected with each other to form a stiffening framework, and
wherein the plurality of solid sections of the stiffening framework surround a plurality of rigid mesh sections.

9. A method for forming an aircraft structural component for reinforcing a fuselage of an aircraft or spacecraft, the structural component being a frame element or a stringer element comprising a planar web segmented into stiffening sections, which are each mutually co-planar, at least a first stiffening section of the stiffening sections being configured as a rigid mesh section, at least a second stiffening section of the stiffening sections being configured as a solid section, a plurality of solid sections being connected with each other to form a stiffening framework, the plurality of solid sections of the stiffening framework surrounding a plurality of rigid mesh sections, the method comprising:
using a computer-based system to operate upon data that corresponds to a geometric configuration of the structural component;
predetermining an expected stress load of the structural component with the computer-based system; and
integrally forming the structural component to segment the structural component into the stiffening sections;
wherein the at least first stiffening section and the at least second stiffening section are arranged and formed using topology optimization, such that a stiffness of the structural component is optimized for a predetermined stress load of the structural component.

10. The method of claim 9, wherein integrally forming the structural component comprises an additive manufacturing process.

11. The method of claim 9, wherein integrally forming the structural component comprises punching and/or milling holes into a sheet metal.

12. The method of claim 9, comprising covering the structural component with a layer of fiber-reinforced composite material.

13. The method of claim 12, wherein the fiber-reinforced composite material contains a polymer matrix reinforced with carbon fibers, the method comprising curing the polymer matrix in an autoclave process.

14. The method of claim 9, wherein the structural component is substantially formed from aluminum or titanium.

15. The method of claim 9, comprising forming at least one of the plurality of solid sections as a frame coupling element and/or a stringer coupling element.

16. The method of claim 9, comprising providing, on at least one of the plurality of solid sections, an assembly area for assembling clips, support angles, and/or brackets to the structural component.

* * * * *